April 5, 1938. R. LANG 2,113,197
ANGLE VALUE TRANSMITTING DEVICE
Filed Dec. 14, 1935
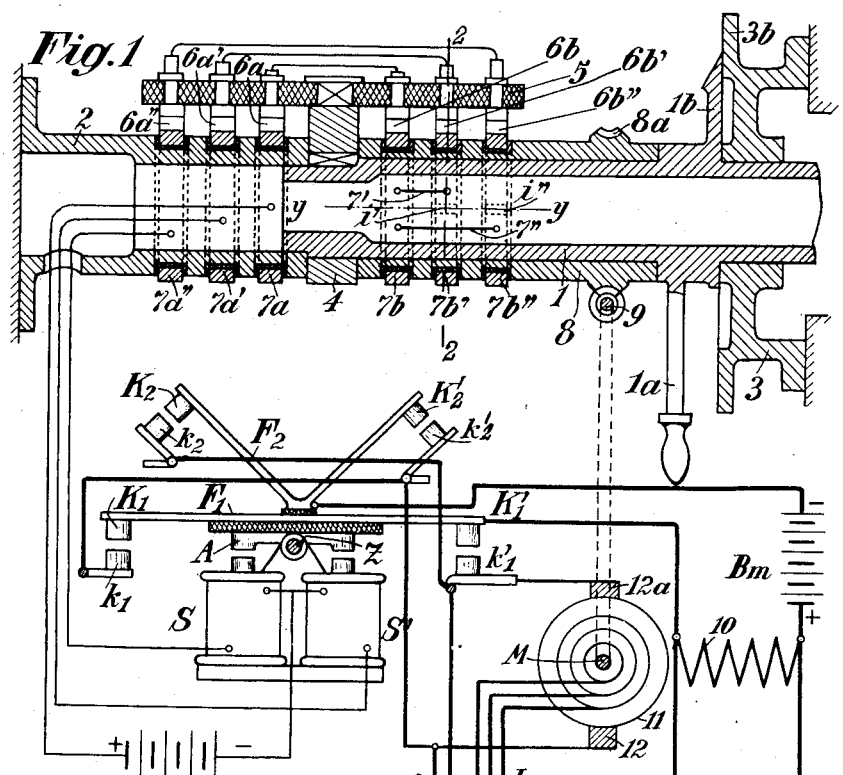
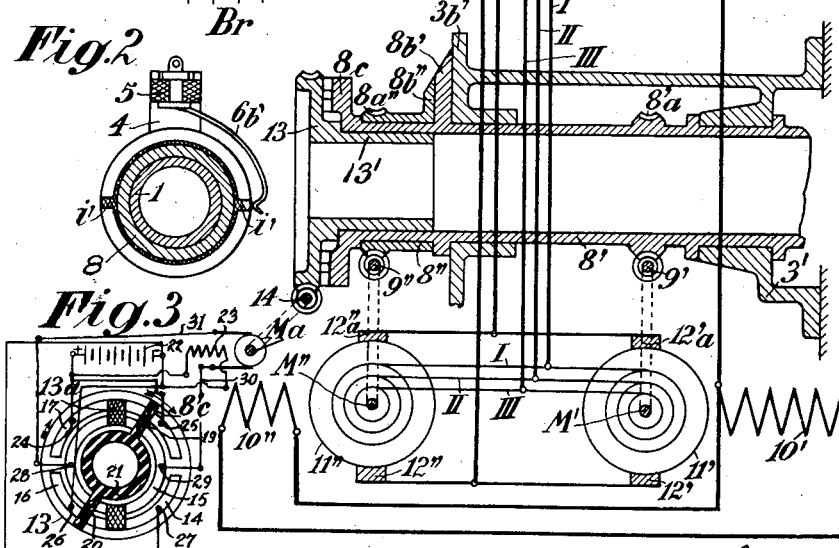
Inventor
Rudolf Lang Patented Apr. 5, 1938

2,113,197

UNITED STATES PATENT OFFICE 2,113,197

ANGLE VALUE TRANSMITTING DEVICE

Rudolf Lang, Vienna, Austria, assignor to the firm Oesterr. Ung. Optische Anstalt C. P. Goerz Gesellschaft m. b. H., Vienna, Austria, a company of Austria Application December 14, 1935, Serial No. 54,526
In Austria December 19, 1934

7 Claims. (Cl. 172—239)

Known devices for the remote transmission in synchronous motion of any angle of rotation of axles, shafts or the like, to one or more angle receiving devices, are as a rule very complicated and consequently also very expensive, if for the rotating of the remotely controlled axles and shafts a considerable expenditure of power is necessary.

These disadvantages are avoided, according to the invention, by a device which consists in the arrangement on the axle or shaft of which the angle of rotation is to be transmitted of a carrier for two sets of mutually insulated contact brushes, three to a set, of which those of the one series rest on three slip rings fixed on an immovable carrier, while the three contact brushes of the other series rest on three slip rings fixed on a sleeve adapted to be rotated by a motor and of which at least two are cut in semi-circular halves. One of the three slip rings of the immovable set is connected directly with one pole of a battery and the other two with the second pole of the battery each through a coil of a tilting relay, whilst the undivided slip ring of the set rotatable by motor is connected with opposite halves of the two divided rings, so that these together act as a commutator when the two brushes pass over the insulating dividing bars. Thereby current is supplied to one or the other coils of the tilting relay, effecting the reversal of the direction of rotation of the two motors by a suitably controlled supply of armature currents, direction of the field currents remaining unaltered.

An embodiment of the invention is shown in the accompanying drawing by way of example, Fig. 1 showing the complete electrical device with circuit diagram, and Fig. 2 a cross-section along the line 2—2 through the angle transmitting device, Fig. 3 showing the reversing contact arrangement for a working motor.

In Fig. 1, the hollow shaft $I$ of the angle transmitting device is rotatably journaled in the immovable hollow shaft 2, and in a bearing 3, and it can be rotated by means of the hand lever $Ia$ through any desired angle, the size of which can be indicated by means of the pointer $Ib$ on the circular scale $3b$. On this transmitter shaft is fixed the brush carrier 4 supporting a brush holder 5 of insulating material. In this are fixed on each side three brushes constructed in the form of contact springs $6a$, $6a'$, $6a''$ and $6b$, $6b'$, and $6b''$, of which the three on one side rest on the slip rings $7a$, $7a'$, $7a''$, and the three on the other side on the slip rings $7b$, $7b'$, $7b''$. The three insulated slip rings $7a$, $7a'$, $7a''$ are fixed as undivided rings on the immovable hollow shaft 2. The three slip rings $7b$, $7b'$, and $7b''$, (of which only one ($7b$) is undivided, whereas the other two are divided in a common axial plane $y$—$y$), are fitted mutually insulated on a rotatable slip ring sleeve 8 carried on the hollow shaft $I$, of which the twist or rotation is effected by means of the worm wheel $8a$ and the motor-driven worm spindle 9. The undivided ring $7b$ is connected with opposite halves of the two divided rings in the manner shown by the conductors $7'$, $7''$, each two corresponding half rings being separated from each other by two narrow insulating segments $i'$, $i''$, the width of which is somewhat greater than the seating surface of the contact springs $6b'$, $6b''$. If these latter are seated exactly on these insulating segments, the device transmitting the angle in synchronous motion, is in the position of rest. If, however, the contact springs are rotated from this position of rest in either direction by the angle to be transmitted, by means of the hand lever $Ia$ fitted on the angle transmitting shaft $I$ for example, then not only is the remotely situated motor-driven angle receiving shaft rotated to the same angle, but the sleeve 8 supporting the two divided rings $7b'$, $7b''$ is simultaneously rotated to the same angle, in order that when the new position of the contact springs is reached the movement of the angle receiving shaft is stopped.

To avoid burning of the contact springs and of the slip ring edges at the insulating segments $i'$—$i''$, during the practical use of the angle transmission in synchronous motion, this contact device should only be used for the switching in, switching out and reversal of a very weak current serving only to supply the magnet coils of a relay which is preferably constructed as a tilting relay. It consists of the two magnet coils S, S', of which the projecting magnet poles are opposite the soft iron armature A adapted to tilt about a centre pin Z. On this soft iron armature is arranged an insulated spring $F_1$ with contact buttons $K_1$, $K_1'$ at each end, and on this a second spring $F_2$ also fixed insulated and bent at right angles with the contact buttons $K_2$, $K_2'$. This armature is held in the central position shown, by a spring not illustrated. The two relay coils S, S' are connected in parallel on the one hand to one pole of the relay battery Br, and on the other hand each to one of the immovable slip rings $7a'$, $7a''$, while the third immovable slip ring $7a$ is connected with the second pole of the relay battery; the potential of the battery is transmitted by means of the two contact springs 6a and 6b conductively connected together to the undivided slip ring 7b fixed on the rotatable angle transmitting sleeve 8. The potential of the second pole of the battery is transmitted through both relay coils S, S' to the slip rings 7a', 7a'', and from these through the contact springs 6a', 6a'' to the contact springs 6b', 6b'' each conductively connected with one of them. If these two last-mentioned contact springs are exactly on the insulating segments $i'$, $i''$ separating the halves of the rings, no battery current flows through either of the two relay coils. If, however, the angle transmitting shaft with the contact springs fitted thereon is rotated in one or the other direction, then one of them is always in contact with one half-ring connected with the ring 7b, whereby the current circuit is closed, so that one of the two relay coils S or S' attracts the tilting armature, and the two contact buttons $K_1$, $K_2$ or $K_1'$, $K_2'$ on the side of the magnetized coil then simultaneously bear on the counter buttons $k_1$, $k_2$ or respectively $k_1'$, $k_2'$. By these contacts, a hitherto open current circuit supplied by the motor battery Bm is closed, after partial reversal of the direction of current. This current circuit consists first of the field magnet coils 10, 10', and 10'', connected in parallel on the one hand to the + pole of Bm, and on the other hand to $K_1$, $K_1'$ of the relay. Of the three direct current motors M, M', M'', M serves for driving the worm spindle 9 of the angle transmitter for the purpose of adjusting the slip ring sleeve 8 into the position of rest; the two motors M' and M'' are arranged on the angle receiver, M' as the driving motor of the apparatus (search-light, artillery) to be adjusted according to the transmitted angle, having to supply a suitable power, whilst the motor M'' has only to effect the rotation of an indicator or pointer. For this purpose, there is rotatably carried in the bearing 3' of the angle receiving device, a hollow shaft 8' which is provided with a worm wheel 8a' in which engages a worm spindle 9' driven by the motor through an intermediate gearing not shown. The hollow shaft 8' is fitted with a pointer 8b' which runs over a circular scale 3b' firmly connected with the bearing 3'. On the extended hollow axle 8' is rotatably carried a sleeve 8'' which is fitted on the one hand with a worm wheel 8a'', and on the other hand with a pointer 8b''. The former engages the worm 9'' driven by the motor M'' through an intermediate transmission, not shown, the three gears arranged between the motors M, M', M'' and the sleeves 8, 8', 8'', having the same and similarly directed transmissions, while the motors are to be individually regulated to approximately like speeds. The armature windings of the three motors receive the direct current reversible by the tilting relay, through the brushes 12—12a, 12'—12a' 12''—12a'' on the commutators 11, 11', 11''. Each supplies to three slip rings, connected according to the rotary converter principle at 120 electrical degrees apart, rotary field potentials, which by means of the three connecting lines I, II, III of all the slip ring brushes of like positions, cause the synchronism of all three motors. For the purpose of reversing the current supplied through the brushes to the armatures connected in parallel to each other, all like positioned brushes are each conductively connected with two diagonally located fixed contact buttons $k_1$—$k_2$, or respectively $k_1'$—$k_2'$, while the spring F2 is connected with the pole of the motor battery.

The method of operation of this synchronous angle transmission is now easily understood.

If the brush holder 4—8 is rotated out of its position of rest in which the contact springs are on the diametrically opposite insulating segments $i'$—$i''$, through a given angle by the rotation of the angle transmitting shaft 1, then the relay current flows from the + pole of the relay battery through 7a—6a—6b—7b either to 6b' or to 6b'', and from there through the relay coil S, or through S', to the — pole of Br. In the first case, $K_1$ comes into contact with $k_1$ and $K_2$ with $k_2$, whilst in the other case $K_1'$ comes into contact with $k_1'$ and $K_2'$ with $k_2'$. In the first case, the current of the motor battery Bm passes from the + pole in parallel through the three field magnet coils 10, 10', 10'' and through $K_1$—$k_1$ and the collector brushes 12, 12', and 12'' into the armatures and from these through the brushes 12a, 12a', and 12a'' through $k_2$, $K_2$ to the — pole of Bm. In the second case, the motor battery current flows from the + pole in parallel through the three field magnet coils and through $K_1'$—$k_1'$ through the brushes 12a, 12a', and 12a'' into the armatures, and from these through the brushes 12, 12', 12'' through $k_2'$—$K_2'$ to the — pole of Bm, so that by reversing the armature current, there is caused a direction of rotation of the armatures opposite to the first direction of rotation. After the synchronous motors have stopped, the pointer 8b' shows the same angle on the scale 3b' as by the pointer 1b on the scale 3b, whilst the pointer 8b'' coincides with 8b'. If, during the angle transmission, the working motor M' should drop out of synchronism, say by overloading and lag with respect to the unloaded motors, the amount at fault would at once be seen by the angular difference between 8b' and 8b'', and it would be possible to correct it by actuating by hand the spindle 9' or respectively the shaft of the motor M'.

It is, however, still better not to have the power loss taken care of by the synchronous motor M' and in particular when this loss is very large. Any desired reversible electromotor can be used, the winding of which is not conductively connected with any winding of the synchronous motors M, M', M'', but the reversing lever 8'c of which is, however, fixed on the hollow shaft 8' of the angle receiver, which corresponds to the sleeve 8 of the angle transmitter. The countercontact disc 13 by its pivot sleeve 13' fitted loosely in the hollow shaft 8' and carrying a usual arrangement of six concentric reversing contact segments, is driven in the direction of rotation of the reversing lever by a worm gear 14 on the shaft of the reversible working motor Ma. The result is that the reversing lever 8'c attains its stop position corresponding to the switched-out condition, on the insulating stripes 13a between the reversing contacts of the contact disc, when the seating surfaces of the contact springs 6b', 6b'' of the brush holder 5 of the angle transmitter rest exactly on the insulating segments $i'$, $i''$.

It will be assumed that when the motor Ma is employed, then under such conditions the sole function of the motor M' is to orient the shaft 8' into the angular position assumed by the shaft 8, complete reliance for the movement and positioning of heavy equipment, such as guns and the like, being placed on the motor Ma. Now, it will be seen from Fig. 1 that while the reversing lever 8'c is fast to the shaft 8' and hence moves therewith, the countercontact disc 13 and pivot sleeve 13' are movable relative thereto. The contact disc 13, Fig. 3, has two contact rings 14 and 15 thereon, ring 14 of which is split into sections 16, 17. Insulation 13a separates ring 15 and sections 16 and 17 each into two separate elements, making six in all, as is conventional and well-known in the art. The reversing lever 8'c has jumpers or the like 19, 20 thereon, to bridge adjacent rings 14, 15, in which case it is obvious that the lever will be formed of insulating material or else will be spaced from the rings and will be insulated as by bushings from the jumpers. Alternatively, as is well understood in the art, the hub 21 of the lever may be of insulating material, in which case the jumpers can be dispensed with. The features of construction of the lever have not been disclosed in great detail, inasmuch as the construction of such levers is conventional, and does not per se form part of my invention.

A battery 22 or similar source of current supply feeds armature 23 of motor Ma in one direction. From the plus pole of the battery current is led to terminals 24, 25 on ring section 17, while from the negative pole current leads extend to terminals 26, 27 on ring section 16. Terminals 28, 29 on ring 15 are connected to the armature of motor Ma.

Now, while motor Ma is deenergized, with reversing lever 8'c at rest across the insulation 13a, we will assume that shaft 8' is moved responsive to a corresponding movement of shaft 8. It therefore becomes necessary to move the heavy equipment by the motor Ma. The lever 8'c rocks one way or the other across the immobile disc 13, away from the insulation 13a. We will assume that it moves to the right in Fig. 3. Then the current flows from the plus pole of the battery 22, terminal 25, ring section 17, jumper 19 to ring 15, terminal 29, lead 30 to armature, lead 31 to terminal 28, ring 15, jumper 20, ring section 16, terminal 26 and back to the negative side of the battery. This energizes the motor Ma, and the power equipment is moved accordingly. At the same time the motor Ma rotates worm 10 so as to move disc 13 in the direction of the previous movement of the lever 8'c, so that shortly after the shaft 8 has reached its new rest position, the insulation 13a will come opposite the jumpers 19, 20 and the motor Ma will cut out.

Had the movement of the lever 8'c been in the opposite direction, i. e. to the left in Fig. 3, then the current would have flowed as follows: From the plus pole of the battery 22 to terminal 24, ring section 17, jumper 19, ring 15, terminal 28, lead 31, motor armature, lead 30, terminal 29, ring 15, jumper 20, ring section 17, terminal 27, back to the minus pole of battery 22. It will be seen that the direction of current flow through the armature is opposite to that in the first-described instance, and since the field is constantly energized in a single direction, the motor Ma would rotate in the opposite direction from that of the instance previously described. The restoring action of the disc 13 relative to the lever 8'c would be the same as previously described with reference to the rotation of the motor Ma as first narrated.

What I claim is:

1. An angle value transmitting device, comprising a rotatable shaft, the angle of which is to be transmitted, a brush carrier fixed on said shaft, a first and second series of contact brushes of three brushes each carried by said carrier and electrically insulated from each other, a stationary shaft coaxial with said first shaft and carrying a first set of three coaxial contact rings with which rings corresponding ones of said first series of brushes contact, a sleeve mounted coaxially on said first shaft, an electric motor for rotating said sleeve about said first shaft, a second set of three coaxial contact rings fast on said sleeve and electrically insulated from each other and from said sleeve, the said second series of brushes respectively cooperating with and bearing on corresponding ones of said second set of rings, insulation separating two of the rings, along the same longitudinal line, of said second set into halves, the third ring of said set being connected to an unlike half of each of said separated rings, corresponding brushes of the first and second series being electrically connected together, a second rotatable shaft to be rotated through the same angle as the first shaft, a motor for rotating said second rotatable shaft, said first and second motors being synchronized, a circuit for energizing said motors, and circuits across said first set of rings for controlling said motor circuit by controlling selected ones of the fields and armatures of the latter, for energizing the motors in a selected direction, depending upon the movement of said first shaft and which of the split rings of the second set is connected to the whole ring thereof, movement of said sleeve restoring the brushes corresponding to the split rings to their rest positions on the insulation thereof, and deenergizing the device.

2. An angle value transmitting device, comprising a rotatable shaft, the angle of which is to be transmitted, a brush carrier fixed on said shaft, a first and second series of contact brushes of three brushes each carried by said carrier and electrically insulated from each other, a stationary shaft coaxial with said first shaft and carrying a first set of three coaxial contact rings with which rings corresponding ones of said first series of brushes contact, a sleeve mounted coaxially on said first shaft, an electric motor for rotating said sleeve about said first shaft, a second set of three coaxial rings fast on said sleeve and electrically insulated therefrom and from each other, the said second series of brushes respectively cooperating with and bearing on corresponding ones of said second set of rings, insulation separating two of the rings, along the same longitudinal line, of said second set into halves, the third ring of said set being connected to an unlike half of each of said separated rings, corresponding brushes of the first and second series being electrically connected together, a second rotatable shaft to be rotated through the same angle as the first shaft, a motor for rotating said second rotatable shaft, said first and second motors being synchronized, a circuit for energizing said motors, a source of current, one pole of which is connected to that one of the first set of rings on the stationary shaft which is connected to the whole ring of the second set of rings, the other pole being connected by separate branch circuits to each of the other rings of said first set, one or the other of said branch circuits being energized upon movement of said first shaft, depending upon the direction of such movement thereof, and upon which of the split rings of the second set is electrically connected to the whole ring thereof, the energized branch circuit controlling said motor circuit by controlling selected ones of the fields and armatures of the latter, for energizing the motors in a selected direction.

3. An angle value transmitting device, comprising a rotatable shaft, the angle of which is to be transmitted, a brush carrier fixed on said shaft, a first and second series of contact brushes of three brushes each carried by said carrier and electrically insulated from each other, a stationary shaft coaxial with said first shaft and carrying a first set of three coaxial contact rings with which rings corresponding ones of said first series of brushes contact, a sleeve mounted coaxially on said first shaft, an electric motor for rotating said sleeve about said first shaft, a second set of three coaxial contact rings fast on said sleeve and electrically insulated from each other and from said sleeve, the said second series of brushes respectively cooperating with and bearing on corresponding ones of said second set of rings, along the same longitudinal line, of said second set into halves, the third ring of said set being connected to an unlike half of each of said separated rings, corresponding brushes of the first and second series being electrically connected together, a second rotatable shaft to be rotated through the same angle as the first shaft, a motor for rotating said second rotatable shaft, said first and second motors being synchronized, a circuit for energizing said motors, a relay having two electromagnets, a source of current to which said electromagnets are connected in parallel, by corresponding terminals thereof, a two-legged armature pivoted across the poles of said electromagnets, one pole of said source of current being connected to that one of the first set of rings on the stationary shaft which is connected to the whole ring of the second set of rings, the free terminals of said electromagnets being connected one to each of said other rings of the first set, one or the other of said electromagnets being energized upon movement of said first shaft, depending upon the direction of such movement thereof, and upon which of the split rings of the second set is electrically connected to the whole ring thereof, contacts on the ends of the armature of said relay and fixed contacts cooperating therewith, said sets of contacts being connected in said motor circuit, and controlling said motors by closing said motor circuit so as to pass current in a desired direction through a selected one of the fields and armatures of said motors, the direction of current flow through the other elements of said fields and armatures being constant, movement of said sleeve restoring the brushes corresponding to the split rings to their rest positions on the insulation thereof, and deenergizing the device.

4. An angle value transmitting device, comprising a rotatable shaft, the angle of which is to be transmitted, a brush carrier fixed on said shaft, a first and second series of contact brushes of three brushes each carried by said carrier and electrically insulated from each other, a stationary shaft coaxial with said first shaft and carrying a first set of three coaxial contact rings with which rings corresponding ones of said first series of brushes contact, a sleeve mounted coaxially on said first shaft, an electric motor for rotating said sleeve about said first shaft, a second set of three coaxial contact rings fast on said sleeve and electrically insulated therefrom and from each other, the said second series of brushes respectively cooperating with and bearing on corresponding ones of said second set of rings, insulation separating two of the rings, along the same longitudinal line, of said second set into halves, the third ring of said set being connected to an unlike half of each of said separated rings, corresponding brushes of the first and second series being electrically connected together, a receiving device for the angle values transmitted, a source of current, an electric motor for energizing said receiving device, a two-legged tilting relay having a magnetizing coil on each of its two legs, a second source of current to which said coils are connected in parallel, by corresponding terminals thereof, one pole of said second source being connected to that one of the first set of rings on the stationary shaft which is connected to the whole ring of the second set of rings, the free terminals of the coils being connected one to each of said other rings of the first set, one or the other of said coils being energized upon movement of said first shaft depending upon the direction of such movement thereof and upon which of the split rings of the second set is electrically connected to the whole ring thereof, contacts on the ends of the legs of said relay and fixed contacts cooperating therewith, a motor circuit including said two motors and said first source of current, said sets of contacts being connected in said motor circuit, and controlling said motors by closing said motor circuit so as to pass current in a desired direction through a selected one of the fields and armatures of said motors, the direction of current flow through the other elements of said fields and armatures being constant, movement of said sleeve restoring the brushes corresponding to the split rings to their rest positions on the insulation thereof, and deenergizing the device.

5. An angle value transmitting device, comprising a rotatable shaft, the angle of which is to be transmitted, a brush carrier fixed on said shaft, a first and second series of contact brushes of three brushes each carried by said carrier and electrically insulated from each other, a stationary shaft coaxial with said first shaft and carrying a first set of three coaxial contact rings with which rings corresponding ones of said first series of brushes contact, a sleeve mounted coaxially on said first shaft, an electric motor for rotating said sleeve about said first shaft, a second set of three coaxial contact rings fast on said sleeve and electrically insulated therefrom and from each other, the second series of brushes respectively cooperating with and bearing on corresponding ones of said second set of rings, along the same longitudinal line, of said second set into halves, the third ring of said set being connected to an unlike half of each of said separated rings, corresponding brushes of the first and second series being connected electrically together, a second rotatable shaft to be rotated through the same angle as the first shaft, a motor for rotating said second rotatable shaft, the first and second motors being synchronized, a circuit for energizing said motors, a relay having two electromagnets, a source of current to which said electromagnets are connected in parallel, by corresponding terminals thereof, a two-legged armature pivoted across the poles of said electromagnets, one pole of said source of current being connected to that one of the first set of rings on the stationary shaft which is connected to the whole ring of the second set of rings, the free terminals of said electromagnets being connected one to each of said other rings of the first set, one or the other of said electromagnets being energized upon movement of said first shaft, depending upon the direction of such movement thereof, and upon which of the split rings of the second set is electrically connected to the whole ring thereof, contacts on the ends of the armature of said relay and fixed contacts cooperating therewith, said sets of contacts being connected in said motor circuit, and controlling said motors by closing said motor circuit so as to pass current in a desired direction through the armatures of said motors, the said armatures being connected together in parallel to synchronize them, the direction of current flow through the fields being constant, movement of said sleeve restoring the brushes corresponding to the split rings to their rest positions on the insulation thereof, and de-energizing the device.

6. An angle value transmitting device, comprising a rotatable shaft, the angle of which is to be transmitted, a brush carrier fixed on said shaft, a first and second series of contact brushes of three brushes each carried by said carrier and electrically insulated from each other, a stationary shaft coaxial with said first shaft and carrying a first set of three coaxial contact rings with which rings corresponding ones of said first series of brushes contact, a sleeve mounted coaxially on said first shaft, an electric motor for rotating said sleeve about said first shaft, a second set of three coaxial contact rings fast on said sleeve and electrically insulated from each other and from said sleeve, the said second series of brushes respectively cooperating with and bearing on corresponding ones of said second set of rings, insulation separating two of the rings, along the same longitudinal line, of said second set into halves, the third ring of said set being connected to an unlike half of each of said separated rings, corresponding brushes of the first and second series being electrically connected together, a second rotatable shaft to be rotated through the same angle as the first shaft, a motor for rotating said second rotatable shaft, a pointer on said second rotatable shaft for indicating the angular position of the latter, and being rotated along with said second rotatable shaft by the cooperating motor, together with any load to be positioned by said second motor, a third motor, a second pointer loosely mounted on said shaft and rotated by said third motor, said second pointer being the sole load of said third motor so that the latter is without appreciable inertia, the three motors being synchronized so that the first and third motors run together and the second motor tends to do so, deviations of said second pointer from said first pointer being a measure of the lag of the second motor relative to the other two, so that such deviation can be corrected either by manual movement of the second rotatable shaft or by further rotation of said second motor, a circuit for energizing said three motors, and circuits across said first set of rings for controlling said motor circuit by controlling selected ones of the fields and armatures of the latter, for energizing the motors in a selected direction, depending upon the movement of said first shaft and which of the split rings of the second set is connected to the whole ring thereof, movement of said sleeve restoring the brushes corresponding to the split rings to their rest positions on the insulation thereof, and deenergizing the device.

7. An angle value transmitting device, comprising a rotatable shaft, the angle of which is to be transmitted, a brush carrier fixed on said shaft, a first and second series of contact brushes of three brushes each carried by said carrier and electrically insulated from each other, a stationary shaft coaxial with said first shaft and carrying a first set of three coaxial contact rings with which rings corresponding ones of said first series of brushes contact, a sleeve mounted coaxially on said first shaft, an electric motor for rotating said sleeve about said first shaft, a second set of three coaxial contact rings fast on said sleeve and electrically insulated therefrom and from each other, the said second series of brushes respectively cooperating with and bearing on corresponding ones of said second set of rings, insulation separating two of the rings, along the same longitudinal line, of said second set into halves, the third ring of said set being connected to an unlike half of each of said separated rings, corresponding brushes of the first and second series being electrically connected together, a second rotatable shaft to be rotated through the same angle as the first shaft, a motor for rotating said second rotatable shaft, a third motor having a separate source of supply and normally inoperable, a reversing lever on said second rotatable shaft, a contact disc for said third motor movable relatively to said reversing lever, and connected to a selected one of the armature and field of said third motor, movement of the reversing lever resulting in energization of said third motor in a desired direction, said third motor when energized actuating a load, means driven by said third motor to restore said contact disc to its rest position relative to said reversing lever, the first two motors being synchronized, a circuit for energizing said first two motors, and circuits across said first set of rings for controlling said motor circuit by controlling selected ones of the fields and armatures of the latter, for energizing the motors in a selected direction, depending upon the movement of said first shaft and which of the split rings of the second set is connected to the whole ring thereof, movement of said sleeve restoring the brushes corresponding to the split rings to their rest positions on the insulation thereof, and deenergizing the device.

RUDOLF LANG.